United States Patent
Wegner et al.

(10) Patent No.: US 10,020,490 B2
(45) Date of Patent: Jul. 10, 2018

(54) EX-SITU PRODUCTION OF A LITHIUM ANODE PROTECTIVE LAYER

(75) Inventors: Marcus Wegner, Leonberg (DE); Jens Grimminger, Leonberg (DE); Martin Tenzer, Unterensingen (DE); Timm Lohmann, Mountain View, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 623 days.

(21) Appl. No.: 13/882,224

(22) PCT Filed: Sep. 1, 2011

(86) PCT No.: PCT/EP2011/065088
§ 371 (c)(1),
(2), (4) Date: Jun. 28, 2013

(87) PCT Pub. No.: WO2012/055614
PCT Pub. Date: May 3, 2012

(65) Prior Publication Data
US 2013/0273422 A1   Oct. 17, 2013

(30) Foreign Application Priority Data

Oct. 29, 2010   (DE) .................. 10 2010 043 111

(51) Int. Cl.
*H01M 4/1395* (2010.01)
*H01M 4/04* (2006.01)
(Continued)

(52) U.S. Cl.
CPC ........... *H01M 4/1395* (2013.01); *H01M 4/04* (2013.01); *H01M 4/134* (2013.01); *H01M 4/366* (2013.01);
(Continued)

(58) Field of Classification Search
CPC .................................................. H01M 4/1395
(Continued)

(56) References Cited

U.S. PATENT DOCUMENTS

| 4,954,371 A | 9/1990 | Yializis |
| 5,681,615 A | 10/1997 | Affinito et al. |

(Continued)

FOREIGN PATENT DOCUMENTS

| CN | 1606188 | 4/2005 |
| CN | 1612377 | 5/2005 |

(Continued)

OTHER PUBLICATIONS

International Search Report for PCT/EP2011/065088, dated Mar. 13, 2012.
(Continued)

*Primary Examiner* — James Lee
(74) *Attorney, Agent, or Firm* — Norton Rose Fulbright US LLP; Gerard Messina

(57) ABSTRACT

In a method for producing an anode for a lithium cell, and/or a lithium cell as well as anodes and lithium cells of this type, to extend the service life of the lithium cell and to selectively form a first protective layer including electrolytic decomposition products, on an anode including metallic lithium, a first electrolyte is applied on the anode ex situ, i.e., prior to assembling the lithium cell to be produced. To stabilize the first protective layer, a second protective layer is applied in a subsequent method step.

10 Claims, 1 Drawing Sheet

(51) Int. Cl.
*H01M 4/134* (2010.01)
*H01M 4/36* (2006.01)
*H01M 4/38* (2006.01)
*H01M 4/40* (2006.01)
*H01M 10/052* (2010.01)
*H01M 10/058* (2010.01)
*H01M 10/42* (2006.01)
*H01M 10/0565* (2010.01)
*H01M 10/0568* (2010.01)
*H01M 10/0569* (2010.01)

(52) U.S. Cl.
CPC .............. *H01M 4/38* (2013.01); *H01M 4/40* (2013.01); *H01M 10/052* (2013.01); *H01M 10/058* (2013.01); *H01M 10/4235* (2013.01); *H01M 10/0565* (2013.01); *H01M 10/0568* (2013.01); *H01M 10/0569* (2013.01); *Y10T 29/49115* (2015.01)

(58) Field of Classification Search
USPC .................................. 429/209, 212; 29/623.5
See application file for complete search history.

(56) References Cited

U.S. PATENT DOCUMENTS

| | | | | |
|---|---|---|---|---|
| 5,882,820 | A * | 3/1999 | Matsui et al. | 429/231.95 |
| 6,103,426 | A * | 8/2000 | Narang | H01M 4/13 |
| | | | | 429/324 |
| 6,183,901 | B1 | 2/2001 | Ying et al. | |
| 2002/0086206 | A1 * | 7/2002 | Fauteux | H01M 4/02 |
| | | | | 429/215 |
| 2003/0190530 | A1 * | 10/2003 | Yang | H01M 2/16 |
| | | | | 429/326 |
| 2005/0008938 | A1 | 1/2005 | Cho et al. | |
| 2005/0042515 | A1 | 2/2005 | Hwang et al. | |
| 2006/0216612 | A1 * | 9/2006 | Jambunathan | H01M 10/052 |
| | | | | 429/326 |
| 2008/0026297 | A1 * | 1/2008 | Chen et al. | 429/341 |

FOREIGN PATENT DOCUMENTS

| | | |
|---|---|---|
| CN | 1879250 | 12/2006 |
| DE | 60 006 150 | 7/2004 |
| DE | 60 2004 008 320 | 5/2008 |
| DE | 69 83 93 45 | 6/2009 |
| DE | 10 2009 060 139 | 6/2011 |
| JP | 07-50162 | 2/1995 |
| JP | H08-250108 A | 9/1996 |
| JP | 2003515892 | 5/2003 |
| JP | 2005044796 | 2/2005 |
| JP | 4807538 | 11/2011 |
| WO | WO 01/39303 | 5/2001 |

OTHER PUBLICATIONS

Ding et al., "1,3-dioxolane pretreatment to improve the interfacial characteristics of a lithium anode", Rare Metals, Press of Metallurgical Industry, vol. 25, No. 4, Aug. 1, 2006, pp. 297-302.*

Ishikawa et al., "Pretreatment of Li metal anode with electrolyte additive for enhancing Li cycleability", Journal of Power Sources, vol. 146, No. 1-2, Aug. 25, 2005, pp. 199-203.*

* cited by examiner

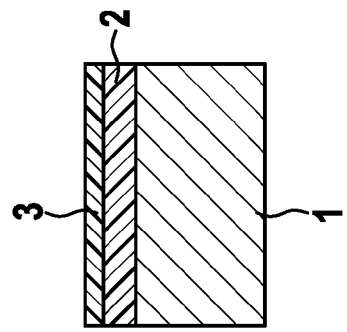
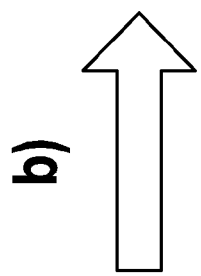
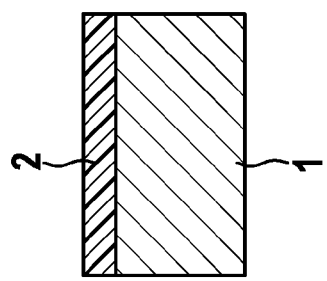
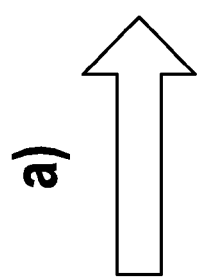
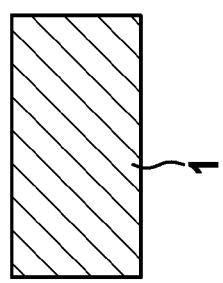

EX-SITU PRODUCTION OF A LITHIUM ANODE PROTECTIVE LAYER

BACKGROUND OF THE INVENTION

1. Field of the Invention

The present invention is directed to a method for producing an anode for a lithium cell, and/or a lithium cell as well as anodes and lithium cells of this type.

2. Description of the Related Art

In conventional lithium cells and lithium-ion cells, a layer of electrolytic decomposition products already forms on the anode right after the cell has been assembled. This layer, which can contain anorganic as well as organic components and is also referred to as solid electrolyte interface (SEI), is indispensable for the operation of a lithium-(ion) battery, since the electrolyte generally is electrochemically unstable with regard to the anode. However, due to aging and also to repeated charging and discharging of the cell, the cell is destroyed repeatedly and rebuilt at the damaged locations, the active material of the anode and the electrolyte being used up on a continuous basis. The method of functioning of anodes containing metallic lithium is affected by this phenomenon to a particular degree.

In addition to using up anode material and electrolyte, the ongoing destruction of the layer also causes more and more dendrites to form at the damaged locations, which may adversely affect the reliability of the entire cell. In the long run, this worsens the overall surface morphology of the anode, so that the anode capacity may be reduced, and the cell may even fail.

BRIEF SUMMARY OF THE INVENTION

The subject matter of the present invention is a method for producing an anode for a lithium cell, and/or a lithium cell, which includes the method step of:
a) applying a first electrolyte on an anode containing metallic lithium, so that a first protective layer is formed on the anode, especially one containing electrolytic decomposition products.

According to the present invention, method step a) takes place ex situ (outside of the lithium cell to be produced) or prior to the assembly, especially of the anode and the cathode, of the lithium cell to be produced. Method step a) in particular may take place prior to assembling the anode, the cathode and the actual electrolyte, subsequently referred to as second electrolyte, of the lithium cell to be produced.

A lithium cell within the meaning of the present invention in particular is a galvanic cell whose anode includes metallic lithium, possibly in the form of an alloy.

The method according to the present invention allows the selective production of a protective layer (solid electrolyte interface (SEI)) including electrolytic decomposition products, on an anode that contains lithium. This is achieved in that the process of the protective layer formation, which normally takes place inside the cell during the first charging and discharging processes, is brought about on the anode in selective manner even before the cell is assembled. This has the advantage that the first protective layer which includes electrolytic decomposition products is able to be effectively stabilized and reinforced in a further method step, so that a permanent and robust protective layer system is produced on the anode, which may have a particularly advantageous effect on the capacity, the service life and the reliability of the cell.

Within the framework of one specific development, the method furthermore includes the method step of:
a1) heating the system from method step a), in particular to a temperature of 30° C., for instance 50° C., for instance to 60° C.

This advantageously makes it possible to facilitate the production of the first protective layer.

Within the framework of another specific development, the method furthermore includes the method step of:
b) applying a polymerizable and/or polymer material on the first protective layer so as to form a second protective layer on the first protective layer.

Because of the second protective layer, the first protective layer is able to be stabilized further, and a stable and permanent separation between the anode and the electrolyte subsequently used in the lithium cell, is able to be ensured. This advantageously makes it possible to increase the service life and the reliability of the anode, and thus also of the entire cell, to a considerable degree. Even if more substantial damage has occurred on the overall cell, an anode protected in this way is able to be shielded from external influences in more optimal manner than an anode provided with a conventional SEI protective layer.

Method step b) in particular may take place prior to an assembly of the anode and the cathode, especially the anode, the cathode and the actual electrolyte, subsequently referred to as second electrolyte, of the lithium cell to be produced.

Within the framework of another specific development, the method furthermore includes the method step of:
b1) irradiating or heating the system from method step b), e.g., using utraviolet or infrared radiation, especially for the polymerization of the polymerizable material.

This advantageously makes it possible to facilitate the development of the second protective layer.

Within the framework of another specific development, the method furthermore includes the method step of:
c) assembling the anode system from method step a), a1), b) or b1), with a cathode, a second electrolyte and possibly one or multiple further cell component(s) in order to form a lithium cell.

Additional cell components may be, for example, a separator, current collectors, current line elements, insulation elements, connection elements, packaging elements, and/or housing elements.

The first electrolyte and/or the second electrolyte may be a liquid or solid electrolyte, especially a liquid electrolyte.

Within the framework of another specific embodiment, the first and/or the second electrolyte include(s) at least one solvent, which is selected from the group made up of carbonic acid esters, lactones, ethers, especially cyclic or acyclic ethers, and combinations thereof.

The carbonic acid esters, for example, may be ethylene carbonate (EC), propylene carbonate (PC), dimethyl carbonate (DMC), diethyl carbonate (DEC) and/or vinylene carbonate (VC), especially ethylene carbonate (EC), propylene carbonate (PC), dimethyl carbonate (DMC) and/or diethyl carbonate (DEC).

The lactones, for example, may be γ-butyrolactone (GBL) or γ-butyrolactone derivatives.

The ethers, in particular may be cyclic or acyclic mono-, di- or tri-ethers, e.g., mono-, di- or trialkylene ethers such as mono-/di-/tri-1.n-alkylene dialkylethers, alkylene being methylene, ethylene(glycol), propylene or butylene and alkyl being methyl, ethyl, propyl or butyl. For example, the ethers may be 1.3-dioxolane (DOL), ethylene glycol dimethyl ether (Glyme, monoethylene glycol dimethyl ether, DME), ethylene glycol diethyl ether (EGDEE), diethylene glycol dimethyl ether (Diglyme) and/or triethylene glycol diemethyl ether (Triglyme, TEGDME).

Within the framework of a further specific development, the first and/or the second electrolyte include(s) at least one supporting electrolyte, which is selected from the group made up of lithium bis(trifluoromethylsulphonyl)imide (LiTFSI), lithium hexafluorophosphate (LiPF$_6$), lithium tetrafluoroborate (LiBF$_4$), lithium trifluoromethanesulfonate (LiCF$_3$SO$_3$), lithium perchlorate (LiClO$_4$), lithium bis(oxalato)borate (LiBOB), lithium fluoride (LiF), lithium nitrate (LiNO$_3$), lithium hexafluoroarsenate (LiAsF$_6$) and combinations thereof.

The second electrolyte preferably has different components and/or a different composition, especially different solvents and/or supporting electrolytes, than the first electrolyte.

Within the framework of a further specific embodiment, the first electrolyte has one or more solvent(s) and/or supporting electrolyte(s), which are more suitable for forming a protective layer of electrolytic decomposition products on the anode material, than the solvent(s) and/or supporting electrolyte(s) of the second electrolyte. For example, this advantageously makes it possible, for one, to form a stable first protective layer and, on the other, to avoid reciprocal effects of the anode with the (second) electrolyte while the cell is in operation.

Within the framework of another specific development, the first electrolyte has a carbonic acid ester or a carbonic acid ester mixture, e.g., a cylic carbonic acid ester or a mixture of cyclic carbonic acid esters, as solvent. The first electrolyte, for example, may include as solvent, a carbonic acid ester or a carbonic acid ester mixture, selected from the group made up ethylene carbonate (EC), propylene carbonate (PC), dimethyl carbonate (DMC), diethyl carbonate (DEC), vinylene carbonate (VC), in particular ethylene carbonate (EC), propylene carbonate (PC), dimethyl carbonate (DMC), diethyl carbonate (DEC) and combinations thereof. Such solvents have shown to be especially advantageous for forming an SEI protective layer.

Within the framework of another specific embodiment, the second electrolyte has as solvent an ether or an ether mixture, such as a cyclic ether or an acyclic ether or a mixture of cyclic and/or acyclic ethers, such as a cyclic or acyclic mono-, di- or triether or a mixture of cyclic and/or acyclic mono-, di- and/or triethers, e.g., one or more mono-, di- or tri-alkylene ethers, e.g., mono-/di-/tri-1.n-alkylene dialkyl ether(s), alkylene in particular being methylene, ethylene(glycol), propylene or butylene, and alkyl being methyl, ethyl, propyl or butyle. For example, the second electrolyte may include as solvent an ether or an ether mixture, selected from the group made up of 1.3-dioxolane (DOL), ethylene glycol dimethyl ether (Glyme, monoethylene glycol dimethyl ether, DME), ethylene glycol diethyl ether (EGDEE), diethylene glykol dimethyl ether (Diglyme) and/or triethylene glykol diemethyl ether (Triglyme, TEGDME) and combinations thereof. Such solvents have shown to be especially advantageous as electrolytic solvents during the operation of the cell.

Within the framework of another specific development, the first electrolyte and/or the polymerizable and/or polymer material has at least one additive, which is selected from the group made up of polymerizable and/or polymerized compounds, especially having polymerizable and/or polymerized double bonds, e.g., acrylic acid derivatives and/or on the basis of acrylic acid derivatives such as butyl acrylate, methyl methacrylate, acrylonitrile, compounds with delocalized electrode systems, such as vinylene carbonate (VC), and/or catechol carbonate, polymers, especially halogenated or perfluorinated polymers, such as polyvinylidene fluoride (PVDF), lithium-ion conducting compounds or solid matter particles, such as aluminum triiodide (AlI$_3$), aluminum trifluoride (AlF$_3$), and/or lanthanum zirconates, and combinations thereof.

Due to polymerizable and/or polymerized compounds, compounds including polymerizable and/or polymerized double bonds and/or having delocalized electrode systems and polymers, it is advantageously possible to reinforce the first and/or the second protective layer.

Using lithium-ion conducting compounds or solid matter particles, the lithium-ion conductivity of the first and/or second protective layer is advantageously able to be improved.

Within the framework of another specific development, the polymerizable and/or polymer material includes one or more monomers, which are selected from the group made up of ethylene oxide, ethylene, propylene, styrene, vinyl carbonate, acrylates and mixtures thereof.

In method step a) or a1), for example, a first protective layer having a layer thickness in a range from ≥0.01 μm to 50 μm is able to be formed. In method step b) or b1), for example, a second protective layer having a layer thickness in a range from 0.01 μm to ≤100 μm is able to be formed.

Preferably, the method is implemented under a noble gas atmosphere, especially an argon atmosphere.

With regard to additional characteristics and advantages of the method according to the present invention, explicit reference is made here to the explanations in connection with the anodes and the lithium cells of the present invention and to the description of the drawing.

Another subject matter of the present invention is an anode for a lithium cell, which is produced by a method according to the present invention.

With regard to additional characteristics and advantages of the anode produced according to the present invention, explicit reference is made here to the explanations in connection with the method and the anode of the present invention and the lithium cells of the present invention as well as to the description of the drawing.

Another subject matter of the present invention is a lithium cell, which is produced by a method according to the present invention.

With regard to additional characteristics and advantages of the lithium cell produced according to the present invention, explicit reference is made here to the explanations in connection with the method, the anodes and the lithium cell according to the present invention and to the description of the drawing.

Another subject matter of the present invention is an anode for a lithium cell, which includes an anode material, a first protective layer, in particular one including electrolytic decomposition products, and a second protective layer, including polymers, in particular. The first protective layer is formed on top the anode material, and the second protective layer is formed on top of the first protective layer.

The first protective layer, for example, may include electrolytic decomposition products from an electrolyte from at least one solvent, which is selected from the group made up of carbonic acid esters, lactones, ethers, especially cyclic or acyclic ethers, and combinations thereof, and at least one supporting electrolyte, which is selected from the group made up of lithium bis(trifluoromethylsulphonyl)imide (LiTFSI), lithium hexafluorophosphate (LiPF$_6$), lithium tetrafluoroborate (LiBF$_4$), lithium trifluoromethanesulfonate (LiCF$_3$SO$_3$), lithium perchlorate (LiClO$_4$), lithium bis(oxalato)borate (LiBOB), lithiumfluoride (LiF), lithium nitrate (LiNO$_3$), lithium hexafluoroarsenate (LiAsF$_6$) and combinations thereof. In particular, the first protective layer may include electrolytic decomposition products from an electrolyte, which has as solvent, a carbonic acid ester or a carbonic acid ester mixture, e.g., a cyclic carbonic acid ester or a mixture of cyclic carbonic acid esters.

The second protective layer, for instance, may include at least one polymer, which is selected from the group made up of polyethylene oxide, polyethylene, polypropylene, polystyrene, polyacrylates, perfluorinated polymers, especially polyethylene oxide, polyethylene, polypropylene, polystyrene, polyacrylates, and combinations thereof.

Preferably, the first and/or second protective layer includes at least one additive, which is selected from the group made up of polymers, especially polymers having polymerized double bonds, e.g., on the basis of acrylic acid derivatives such as butyl acrylate, methyl methacrylate, acrylonitrile, and/or halogenated or perfluorinated polymers such as polyvinylidene fluoride (PVDF), compounds with delocalized electrode systems, such as vinylene carbonate (VC) and/or catechol carbonate, lithium-ion conducting compounds or solid matter particles, such as aluminum triiodide (AlI$_3$), aluminium trifluoride AlF$_3$) and/or lanthanum zirconates, and combinations thereof.

For example, the first protective layer may have a layer thickness in a range from ≥0.01 µm to ≤50 µm and the second layer may have a layer thickness in a range from ≥0.01 µm≤100 µm.

With regard to additional features and advantages of the anode produced according to the present invention, explicit reference is made here to the explanations in connection with the method of the present invention and the anode produced according to the present invention and the lithium cells of the present invention as well as to the description of the drawing.

Another subject matter of the present invention is a lithium cell, which includes an anode according to the present invention.

The lithium cell, for example, may have an electrolyte, which includes at least one solvent, which is selected from the group made up of carbonic acid esters, lactones, ethers, especially cyclic or acyclic ethers, and combinations thereof.

The carbonic acid esters, for example, may be ethylene carbonate (EC), propylene carbonate (PC), dimethyl carbonate (DMC), diethyl carbonate (DEC) and/or vinylene carbonate (VC), especially ethylene carbonate (EC), propylene carbonate (PC), dimethyl carbonate (DMC) and/or diethyl carbonate (DEC).

The lactones, for example, may be γ-butyrolactone (GBL) or γ-butyrolactone derivatives.

The ethers, in particular may be cyclic or acyclic mono-, di- or triethers, e.g., mono-, di- or trialkylene ether such as mono-/di-/tri-1.n-alkylene dialkyl ethers, alkylene in particular being methylene, ethylene(glycol), propylene or butylene, and alkyl being methyl, ethyl, propyl or butyl. For example, the ethers may be 1.3-dioxolane (DOL), ethylene glycol dimethyl ether (Glyme, monoethylene glycol dimethyl ether, DME), ethylene glycol diethyl ether (EGDEE), diethylene glycol dimethyl ether (Diglyme) and/or triethylene glycol dimethyl ether (Triglyme, TEGDME).

Preferably, the lithium cell includes an electrolyte, which has as solvent an ether or an ether mixture, e.g., a cyclic or acyclic ether, or a mixture of cyclic and acyclic ethers, for instance one or more cyclic or acyclic mono-, di- or triethers, especially one or more mono-, di- or trialkylene ether(s), such as mono-/di-/, tri-1.n-alkylene dialkyl ether. The alkylene in particular may represent methylene, ethylene(glykol), propylene or butylene, and alkyl may represent methyl, ethyl, propyl or butyl. For example, the lithium cell may include an electrolyte which has as solvent an ether or an ether mixture, selected from the group made up of 1.3-dioxolane (DOL), ethylene glycol dimethyl ether (Glyme, monoethylene glycol dimethyl ether, DME), ethylene glycol diethyl ether (EGDEE), diethylene glykol dimethyl ether (Diglyme) und/oder triethylene glykol dimethyl ether (Triglyme, TEGDME) and combinations thereof.

For example, the lithium cell may include an electrolyte which includes at least one supporting electrolyte selected from the group made up of lithium bis (trifluoromethylsulphonyl)imide (LiTFSI), lithium hexafluorophosphate (LiPF$_6$), lithium tetrafluoroborate (LiBF$_4$), lithium trifluoromethanesulfonate (LiCF$_3$SO$_3$), lithium perchlorate (LiClO$_4$), lithium bis(oxalato) borate (LiBOB), lithium fluoride (LiF), lithium nitrate (LiNO$_3$), lithium hexafluroroarsenate (LiAsF$_6$), and combinations thereof.

With regard to additional characteristics and advantages of the lithium cell produced according to the present invention, explicit reference is made here to the explanations in connection with the method and the anodes of the present invention, the lithium cell produced according to the present invention and to the description of the drawing.

Another subject matter of the present invention is an electric device which includes a lithium cell according to the present invention. For example, the electric device may be a device selected from the group made up of electric tools, electric garden tools, computers such as stand-alone computers, notebooks, multimedia devices, telecommunication devices such as mobile phones and PDAs, hybrid vehicles, plug-in hybrid vehicles, electric vehicles and combinations thereof. With regard to further features and advantages, explicit reference is made here to the above explanations and the following description of the drawing.

BRIEF DESCRIPTION OF THE DRAWINGS

FIG. 1 shows a schematic representation of one specific embodiment of the method according to the present invention and the anodes according to the present invention.

DETAILED DESCRIPTION OF THE INVENTION

FIG. 1 illustrates that a first electrolyte is applied on an anode 1 ex situ, that is, prior to the assembly of the lithium cell to be produced, in method step a) of the method of the present invention, the anode including metallic lithium in elementary form or in the form of an alloy. Because of the chemical instability of the first electrolyte, reactions arise whose products form a thin first protective layer 2 on anode 1.

The formation of first protective layer 2 may be facilitated by heating, or a thermal treatment of the system, for instance at approximately 60° C., within the framework of a method step a1).

In a following method step b), a second protective layer 3 is applied on top of first protective layer 2 produced in this manner, for reinforcement and stabilization purposes. A polymerizable and/or polymer material is deposited on first protective layer 2 for this purpose. This second protective layer 2 preferably is applied as very thin layer in order not to adversely affect the ionic conductivity. A second protective layer having a thickness of only a few micrometers, e.g., a layer thickness in a range from ≥0.01 µm to ≤100 µm, already suffices for sufficient stabilization of first protective layer 2. Second protective layer 3 preferably is produced in that a composition made of a monomer type or a mixture of different monomer types, which may possibly include one or more additive(s) and/or solvent(s), is applied on first protective layer 2.

The applied composition may then polymerize and firmly bond with first protective layer 2 in the process and form a solid protective layer composite 2,3. This is impossible in the case of conventional SEI protective layers produced in situ.

The polymerization may be initiated radically or anionically, depending on the monomers used. This makes it possible to facilitate the formation of second protective layer 3, especially the polymerization of the polymerizable material, for instance by irradiation or heating of the system from method step b) within the framework of a method step b1).

Because of second protective layer 3, first protective layer 2 is advantageously stabilized, so that protective layer system 2,3 formed on anode 1 is markedly more stable and has a longer service life than an SEI protective layer formed in situ in the cell.

Then, in another method step c) (not shown here), the anode produced in this manner is able to be assembled together with a cathode, a second electrolyte and possibly one or more additional cell components, in order to form a lithium cell assembly.

What is claimed is:

1. A method for producing a lithium cell, comprising:
   a) applying a first electrolyte on an anode including metallic lithium;
   b) heating the anode with the first electrolyte applied thereto to a temperature of ≥30° C. to form a first protective layer containing electrolytic decomposition products on the anode;
   c) applying at least one of a polymerizable material and a polymer material on the first protective layer to form a second protective layer on the first protective layer, thereby forming an anode system; and
   d) forming the lithium cell by assembling together at least (1) the anode system from method step c), (2) a cathode, and (3) a second electrolyte, wherein a composition of the second electrolyte is different from a composition of the first electrolyte, each of the first and second electrolytes being formed of at least one material of which the other of the first and second electrolytes is not formed.

2. The method as recited in claim 1, further comprising:
   e) irradiating or heating the anode system from method step c) for polymerization of the polymerizable material.

3. The method as recited in claim 1, wherein at least one of the first and second electrolytes includes at least one solvent selected from the group consisting of carbonic acid esters, lactones, and ethers.

4. The method as recited in claim 1, wherein at least one of the first and second electrolytes includes at least one supporting electrolyte selected from the group consisting of lithium bis (trifluoromethylsulphonyl)imide, lithium hexafluorophosphate, lithium tetrafluoroborate, lithium trifluoromethanesulfonate, lithium perchlorate, lithium bis(oxalato)borate, lithium fluoride, lithium nitrate, and lithium hexafluoroarsenate.

5. The method as recited in claim 1, wherein the first electrolyte has at least one of a solvent and a supporting electrolyte which is more suitable for forming a protective layer of electrolytic decomposition products on the metallic lithium than at least one of a solvent and a supporting electrolyte of the second electrolyte.

6. The method as recited in claim 1, wherein:
   the first electrolyte has as solvent a cylic carbonic acid ester or a mixture of cyclic carbonic acid esters; and
   the second electrolyte has as solvent: (i) a cyclic or an acyclic mono-, di- or triether; or (ii) a mixture of at least two of cyclic and acyclic mono-, di- and tri-ethers.

7. The method as recited in claim 1, wherein at least one of the first electrolyte, the polymerizable material, and the polymer material has at least one additive selected from the group consisting of: polymerizable compounds having polymerizable double bonds; polymerized compounds having polymerized double bonds; vinylene carbonate; catechol carbonate; halogenated polymers; perfluorinated polymers; aluminum triiodide; aluminum trifluoride; and lanthanum zirconates.

8. The method as recited in claim 7, wherein at least one of the polymerizable material and the polymer material includes at least one monomer selected from the group consisting of ethylene oxide, ethylene, propylene, styrene, vinyl carbonate, and acrylates.

9. The method as recited in claim 1, wherein the second electrolyte is separate and distinct from the first protective layer.

10. A method, comprising:
   a) applying a first electrolyte on an anode, wherein the anode includes metallic lithium;
   b) heating the anode with the first electrolyte applied thereto to a temperature of ≥30° C., thereby transforming the first electrolyte into a first protective layer on the anode, the first protective layer containing electrolytic decomposition products of the first electrolyte;
   c) applying at least one of a polymerizable material and a polymer material on the first protective layer to form a second protective layer on the first protective layer, thereby forming an anode system that includes (1) the anode, (2) the first protective layer, and (3) the second protective layer; and
   d) forming a lithium cell by assembling together (1) the formed anode system that includes the anode and the first and second protective layers, (2) a second electrolyte, and (3) a cathode;
   wherein:
      the first electrolyte that is transformed into the first protective layer includes at least one material not included in the second electrolyte; and
      the second electrolyte includes at least one material that is not included in the first electrolyte that is transformed into the first protective layer.

\* \* \* \* \*